United States Patent [19]

Lapeyre

[11] 4,154,333

[45] May 15, 1979

[54] MODULAR CONVEYOR HAVING INTEGRAL RECEPTACLES

[75] Inventor: James M. Lapeyre, New Orleans, La.

[73] Assignee: The Laitram Corporation, New Orleans, La.

[21] Appl. No.: 838,532

[22] Filed: Oct. 3, 1977

[51] Int. Cl.² ............................................. B65G 17/36
[52] U.S. Cl. ..................................... 198/707; 198/713
[58] Field of Search .............. 198/707, 713, 714, 715, 198/831, 850–853, 654, 655, 701, 793

[56] References Cited

U.S. PATENT DOCUMENTS

| 1,191,434 | 7/1916 | Keith | 198/852 |
| 2,704,943 | 3/1955 | Harris | 198/852 |
| 3,685,637 | 8/1972 | Bildsoe | 198/850 |
| 3,730,331 | 5/1973 | Goldberg | 198/850 |
| 3,750,864 | 8/1973 | Nolte | 198/707 |
| 4,019,625 | 4/1977 | Wiese | 198/713 |

FOREIGN PATENT DOCUMENTS 7502105  9/1975  Netherlands .............................. 198/852

Primary Examiner—Joseph E. Valenza
Attorney, Agent, or Firm—Weingarten, Maxham & Schurgin

[57] ABSTRACT

A modular conveyor comprising a plurality of interconnected modules each module having a receptacle integral therewith and in which each module is pivotable about both a horizontal and a vertical axis. The module receptacles are in a closed position during conveyor movement along a straight path or through horizontal turns, while during movement of the conveyor through a vertical turn, the receptacles are in an open position for dispensing or releasing of a product contained therein.

8 Claims, 7 Drawing Figures

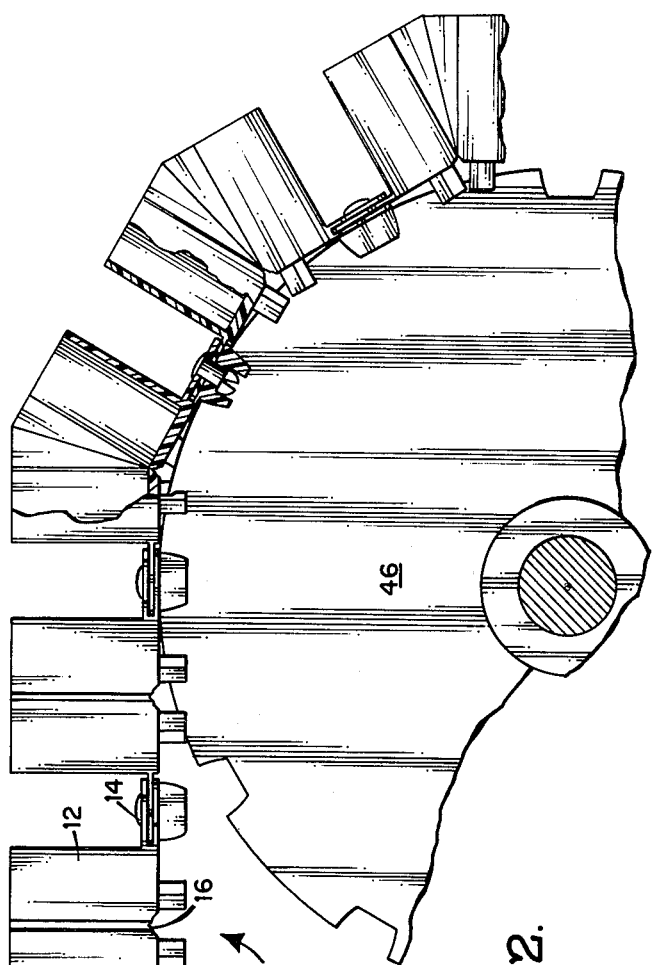
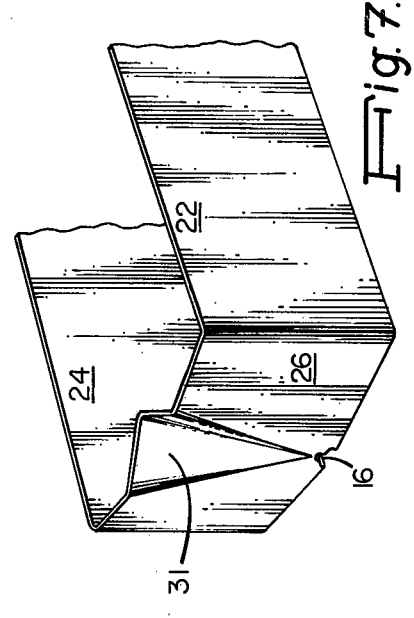
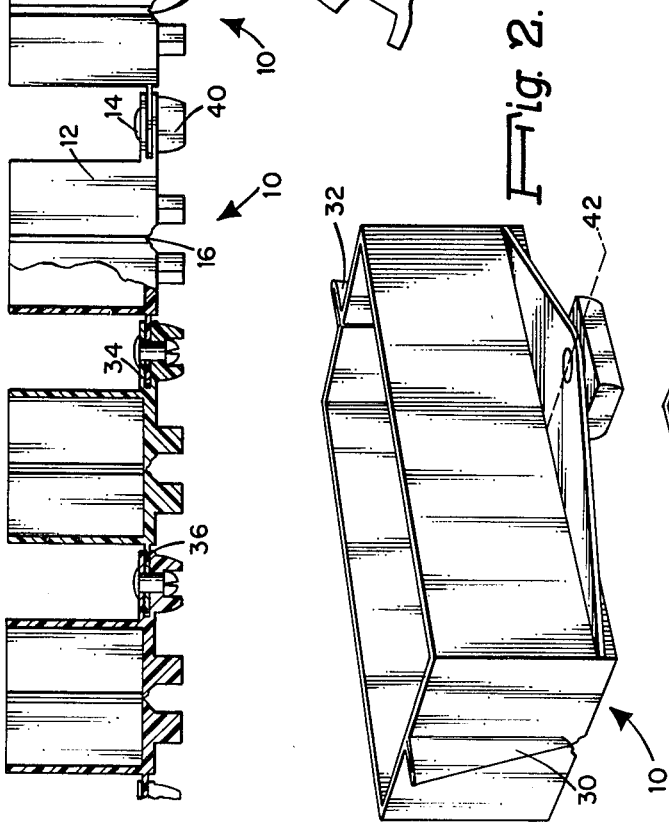
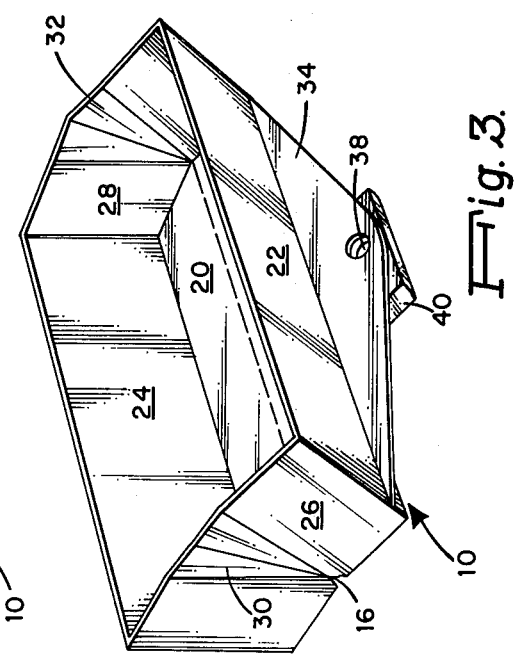

MODULAR CONVEYOR HAVING INTEGRAL RECEPTACLES

FIELD OF THE INVENTION

This invention relates to conveyors and more particularly to a modular conveyor composed of interconnected identical modules each having an integrally formed receptacle for containment of a product.

BACKGROUND OF THE INVENTION

In the processing of food and other products, it is often required to fill a receptacle with a product or ingredients thereof and after a processing sequence, to remove the product from the receptacle for packaging or other subsequent use. As an example, in the processing of frozen foods, a food product is dispensed into an appropriate receptacle and after freezing is removed from the receptacle for packaging. It is an object of this invention to provide a conveyor of modular form in which each module has an integrally formed receptacle into which a product can be supplied for transport through a processing cycle by the conveyor and automatically released from the receptacle by movement of the conveyor through a vertical turn.

The novel conveyor is similar to the conveyor described in copending application Ser. No. 768,531, fled Feb. 14, 1977, and assigned to the assignee of this invention. That conveyor comprises a plurality of identical interconnected modular links and capable of movement through straight and multiply curved travel paths. The conveyor is operative to be moved in a curved path in the conveyor plane and in a curved path in a plane transverse to the conveyor plane. Each link of the conveyor serves as an identical modular unit which includes linking ends pivotally connected to the linking ends of adjacent links for relative pivotal movement of adjacent links about a first axis. Each modular link is composed of two sections which are pivotally joined at a position intermediate the linking ends for relative pivotal movement of the sections about a second axis orthogonal to the first axis. Thus, the link sections are relatively pivotable in a first plane, while the adjacent links are relatively pivotable in an orthogonal plane, such that the conveyor belt composed of these interconnected links is bi-directionally movable to provide versatile transport along various intended paths. The conveyor is capable of being driven by a horizontally disposed sprocket or by a vertically disposed sprocket for corresponding movement in a horizontal turn and in a vertical turn.

SUMMARY OF THE INVENTION

In brief, the novel modular conveyor comprises a plurality of interconnected modules in which each module has a receptacle integral therewith and in which each module is pivotable about both a horizontal and a vertical axis. During movement along a straight path or through horizontal turns, the module receptacles are in a closed position in which a product can be supplied to and carried by the receptacles. During movement of the conveyor modules through a vertical turn, the receptacles are in an open position for dispensing or releasing of a product contained therein. Preferably, the conveyor modules and the integral receptacles are formed of a plastic material and are simply and inexpensively produced.

DESCRIPTION OF THE DRAWINGS

The invention will be more fully understood from the following detailed description taken in conjunction with the accompanying drawings in which:

FIG. 1 is an elevation view, partly cutaway, of a modular conveyor according to the invention shown in a vertical turn;

FIG. 2 is a pictorial view of a conveyor module embodying the invention and illustrated in its closed position;

FIG. 3 is a pictorial view of the conveyor module of FIG. 2 illustrated in its open position;

FIG. 7 is a cutaway pictorial view of an alternative conveyor module according to the invention.

DETAILED DESCRIPTION OF THE INVENTION

Figure 4:
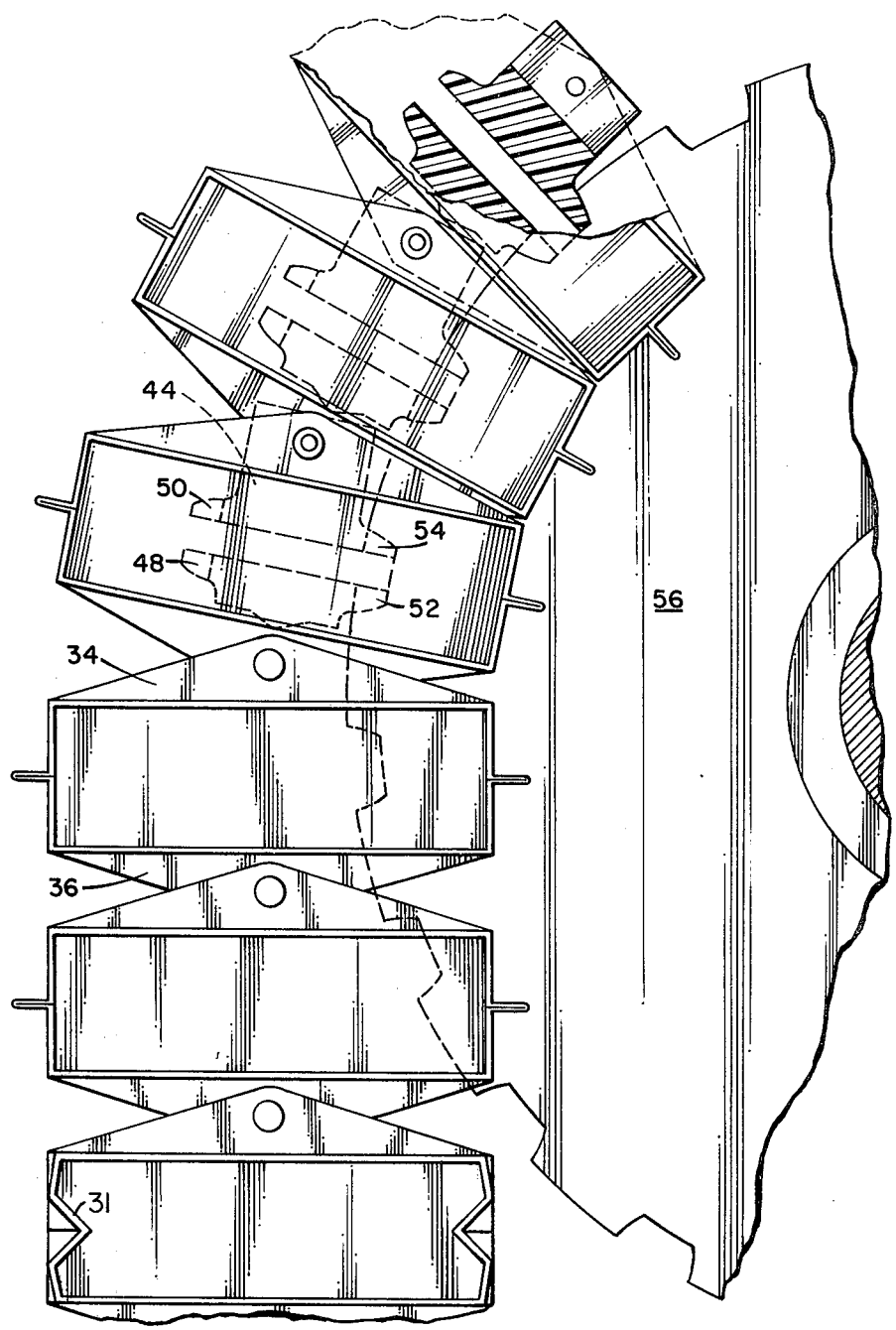
FIG. 4 is a plan view, partly cutaway, of a modular conveyor according to the invention shown in a horizontal turn.

Referring to FIG. 1, there is shown a modular conveyor composed of a plurality of identical modules 10 each having a receptacle 12 integrally formed therewith. Each module 10 is pivotable about a normally vertical axis by means of vertical pivot pins 14 interconnecting each module to adjacent like modules, and is pivotable about a normally horizontal axis defined by a hinge portion 16 in the bottom wall intermediate the vertical pivots. The receptacle 12 is of generally rectangular shape having outwardly extending flexible folded portions provided in respective side walls to accommodate opening of the receptacles upon pivotable movement of the module about hinge portion 16.

The conveyor module and its integral receptacle is illustrated in closed position in FIG. 2 and in open position in FIG. 3. Each module includes a bottom wall 20 having hinge portion 16 extending across the full width thereof, the hinge portion being of reduced thickness with respect to the thickness of the bottom wall to provide a hinge for pivotal movement of the two bottom wall sections joined by the hinge. The receptacle 12 is composed of front and back walls 22 and 24 and side walls 26 and 28 upstanding from bottom wall 20. The side walls 26 and 28 are each hinged by outwardly extending folded portions 30 and 32, respectively, disposed in alignment with hinge portion 16 to permit opening of the receptacle upon flexing of the bottom wall of the module, as shown in FIG. 3. The folded portions can also be inwardly extending as shown by reference numeral 31 in FIG. 7, or of other flexible construction to permit opening and closing of the receptacle. One of the receptacles in FIG. 5 also depicts the construction having inwardly extending portions 31.

Figure 5:
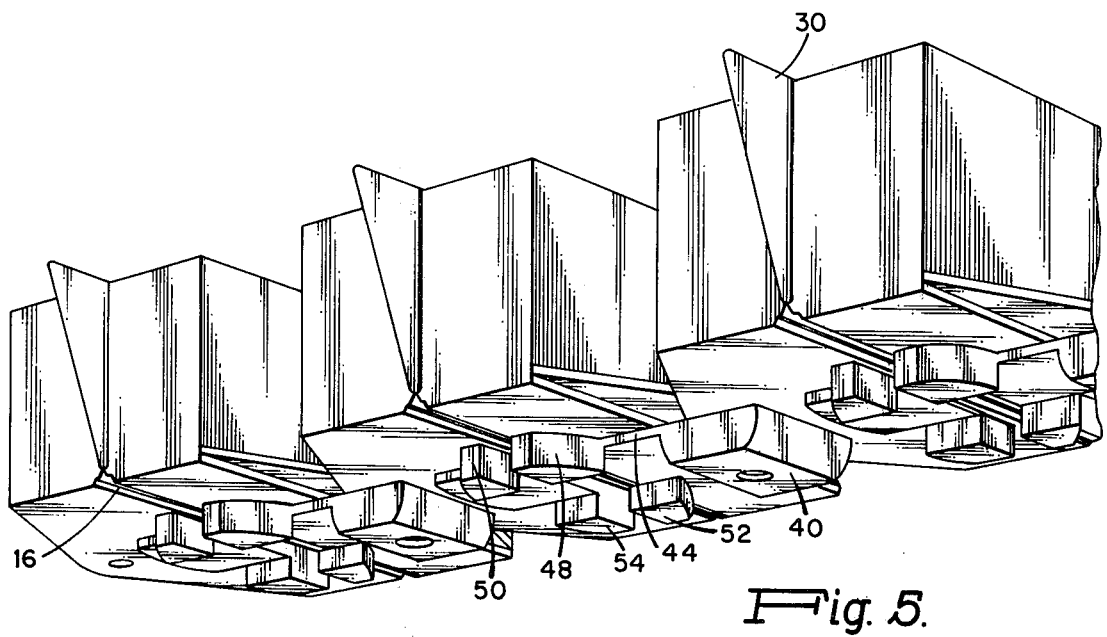
FIG. 5 is a pictorial view of the modular conveyor further illustrating the bottom construction.

Each module includes first and second end portions 34 and 36 extending outwardly from respective walls 22 and 24 at or near the plane of bottom wall 20. Each end portion includes an opening 38 therethrough for receipt of a vertical pivot pin 14. A sprocket plate 40 is disposed symmetrically with respect to longitudinal axis 42 and with respect to the pivot axis of pin 14 and outwardly extending from the bottom wall 20. Sprocket plate 40 is spaced from the confronting end portions 34 to provide a slot into which the end portion 36 of an adjacent module is inserted and connected by means of vertical pivot pin 14. The modules as thus connected are shown in FIGS. 1 and 5, and are seen to be in balanced shear with respect to pins 14. An opening is provided through sprocket plate 40 in alignment with opening 38 to accommodate the pivot pin. In the illustrated embodiment, the sprocket plate 40 extends from a central portion 44 of bottom wall 20 and which provides further structural strength. Sprocket plate 40 is cooperative with a vertical sprocket wheel 46 for movement in a vertical turn as depicted in FIG. 1.

Sprocket means are also provided on each module for cooperation with a horizontally disposed sprocket wheel for movement of interconnected modules through a horizontal turn. As best seen in FIG. 4, horizontal sprocket teeth are provided by elements 48 and 50 on one side of the module and elements 52 and 54 on the opposite side of the module. Either pair of elements can serve as sprocket teeth depending upon the side at which the horizontal sprocket wheel is disposed. These elements 48, 50, 52 and 54 are disposed symmetrically with respect to longitudinal axis 42 and with respect to the hinge portion 16. As shown in FIG. 5, the elements 52 and 54 are, with the interconnected modules lying in a horizontal plane, cooperative with horizontal sprocket wheel 56.

Figure 6:
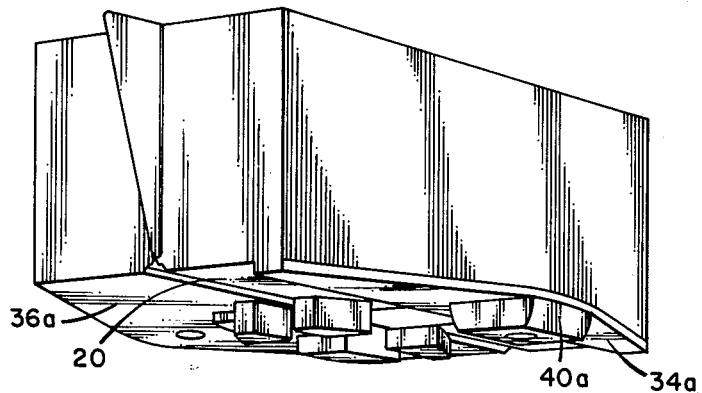
FIG. 6 is a pictorial view of an alternative embodiment of the conveyor module.

In alternative embodiment shown in FIG. 6, end portion 36a outwardly extends in the plane of bottom wall 20, while the other end portion 34a is disposed below the plane of bottom wall 20 by approximately the thickness of the end portion. The sprocket plate 40a is integral with and outwardly extends from end portion 34a. For interconnection of the modules, end portion 36a of an adjacent module is disposed on top of portion 34a and pivotally connected thereto by means of a pivot pin such as pin 14.

Each module 10 is preferably formed as a single integral unit preferably by molding of a suitable plastic material compatible with the product carried thereby and with the process environment to which the conveyor is exposed. The pivot pins 14 can also be fabricated of the same or compatible plastic material.

In operation, the interconnected modules are disposed along an intended travel path which can include both vertical and horizontal turns. Either a vertical sprocket wheel or horizontal sprocket wheel can serve as the driving sprocket to propel the novel conveyor through its path. During movement of the module in a horizontal plane, receptacles 12 are in closed position in which a product can be supplied to and carried by the receptacles. A particular application of the novel conveyor is in the frozen food processing industry and wherein a product in unfrozen state can be supplied to the closed receptacles in liquid or paste form. The conveyor is then moved through a cooling chamber for freezing or setting of the product, after which the conveyor is moved through a vertical turn as shown in FIG. 1 during which turning movement the receptacles 12 are opened to dispense the product. The product is readily released from the receptacle by flexure of bottom wall 20 about hinge portion 16. After release of the product, the modules are transported back to a supply position along the travel path.

The invention is not to be limited except as indicated in the appended claims.

What is claimed is:

1. A modular conveyor capable of movement in a curved path in the conveyor plane and in a curved path in a plane transverse to the conveyor plane and comprising a plurality of modules each including:

a bottom wall having a first link section and a second link section pivotally interconnected for pivotal movement of said first and second sections about a normally horizontal axis transverse to the longitudinal conveyor axis;

first and second end portions each pivotally connected to an end portion of an adjacent module for pivotal movement of adjacent modules about a normally vertical axis and displaced from said normally horizontal axis along the conveyor axis; and a receptacle integrally formed with said module and disposed between said end portions and including side walls having flexible portions to accommodate opening of the receptacle upon pivotal movement of the module about its normally horizontal axis.

2. The modular conveyor of claim 1 wherein each of said modules includes:

a sprocket plate integral with the bottom wall and disposed symmetrically with respect to the longitudinal conveyor axis and with respect to said normally vertical axis and cooperative with a vertical sprocket wheel for movement of the modules in a vertical turn; and sprocket elements integral with the bottom wall and disposed symmetrically with respect to the longitudinal conveyor axis and with respect to said normally horizontal axis and cooperative with a horizontal sprocket wheel for movement of the modules in a horizontal turn.

3. The modular conveyor of claim 2 wherein said first and second link sections are joined for pivotal movement about said normally horizontal axis by a flex hinge integral with said bottom wall and joining said first and second link sections.

4. The modular conveyor of claim 3 wherein said receptacle includes:

a plurality of walls integral with and upstanding from said bottom wall to provide a closed receptacle; and the flexible portions of said side walls being of flexible folded configuration disposed in alignment with said flex hinge.

5. The modular conveyor of claim 3 wherein said end portions extend outwardly substantially at the plane of the bottom wall along said conveyor axis, the vertical sprocket plate being integral and outwardly extending from one of said end portions; and an opening provided symmetrically through said one end portion and said sprocket plate for accommodation of a pivot pin for pivotal interconnection of adjacent modules.

6. The modular conveyor of claim 2 wherein one of said end portions has a bottom surface disposed substantially in the plane of the upper surface of the other end portion such that the one end portion of a module is disposed over the other end portion of an adjacent module and pivotally connected thereto.

7. The modular conveyor of claim 6 wherein the vertical sprocket plate is spaced from the bottom surface of said one end portion to provide a slot into which the other end portion of an adjacent module is inserted and pivotally connected.

8. The modular conveyor of claim 2 wherein said sprocket elements include:

first and second pairs of elements each pair disposed on a respective side of the longitudinal axis symmetrical with respect to the longitudinal axis and with respect to said normally horizontal axis, each pair of elements being cooperative with a horizontal sprocket wheel with the module lying in a normally horizontal plane.

* * * * *